UNITED STATES PATENT OFFICE.

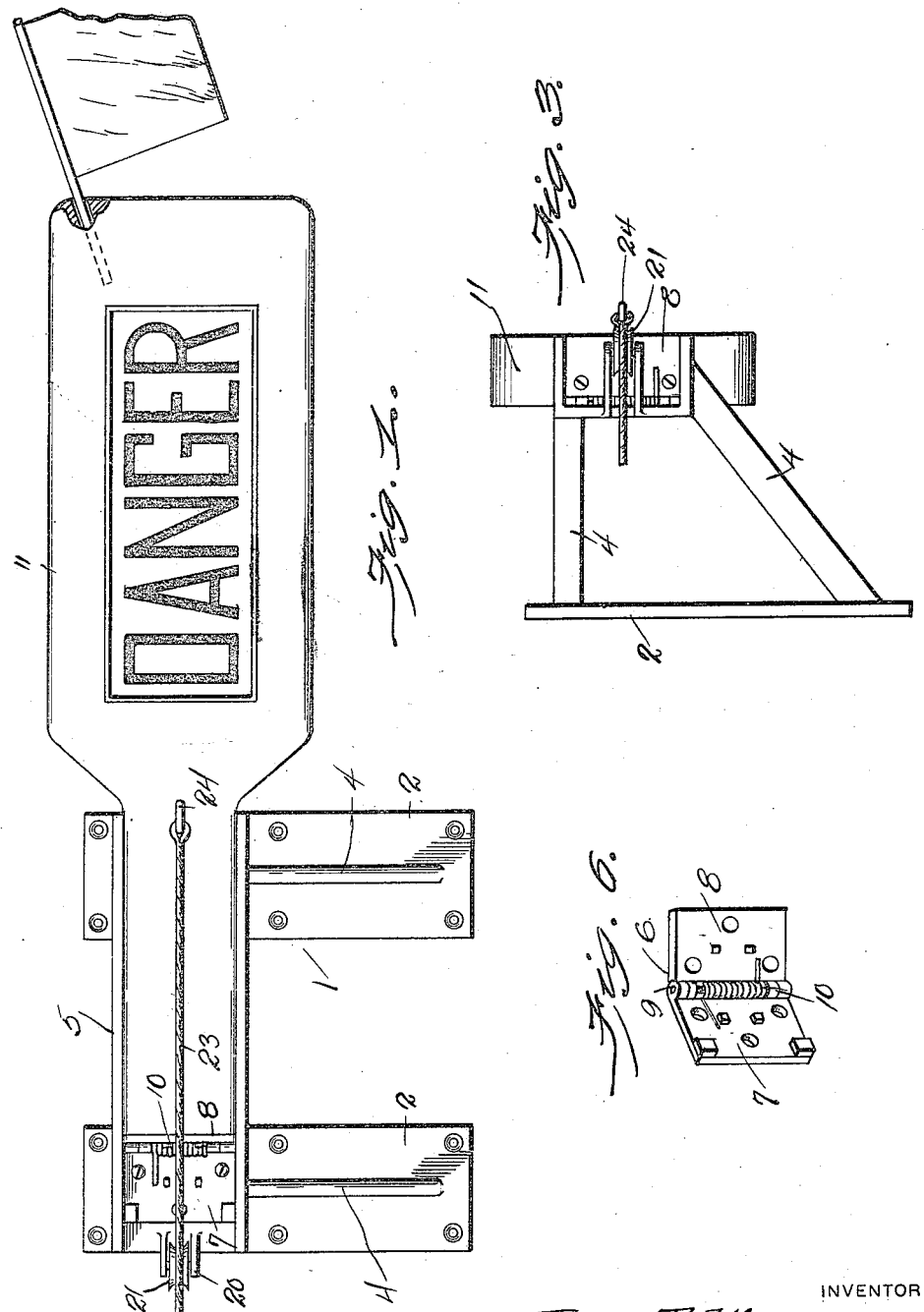

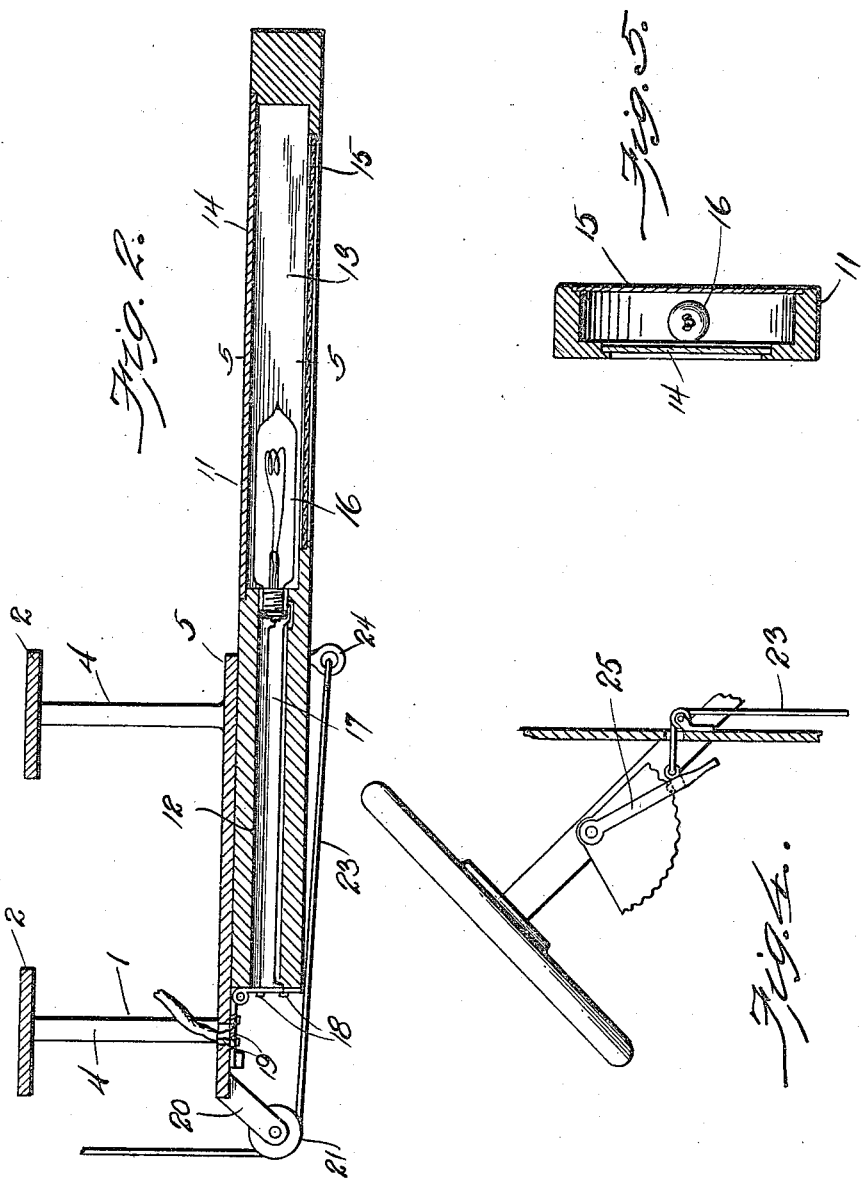

JESSE THOMAS WEAVER, OF JACKSON, MICHIGAN.

AUTOMOBILE-SIGNAL.

1,268,519.  Specification of Letters Patent.  Patented June 4, 1918.

Application filed October 8, 1917. Serial No. 195,376.

*To all whom it may concern:*

Be it known that JESSE T. WEAVER, a citizen of the United States, residing at Jackson, in the county of Jackson and State of Michigan, have invented certain new and useful Improvements in Automobile-Signals, of which the following is a specification.

This invention relates to automobile signals and more particularly to a signal adapted to be manually operated from the operator's seat and adapted to be attached to the automobile body at a convenient point whereby the operator may operate the signal arm to indicate to approaching or following vehicles the course he is about to take whereby traffic rules and regulations may be complied with.

A further object of the invention is the provision of a device of this character that may be easily placed into operative position by a slight pull on an operating lever disposed within convenient reach of the operator and which, during darkness, will at the same time illuminate a visible signal within the signal arm.

A further object of this invention is the provision of an automobile signal which consists of comparatively few parts and which is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation of the device detached from the automobile body.

Fig. 2 is a horizontal longitudinal section.

Fig. 3 is an end view.

Fig. 4 is a detail section of a steering column and wheel, showing the method of operating the device.

Fig. 5 is a section on the line 5—5 of Fig. 2.

Fig. 6 is a detail perspective view of the hinge for supporting the signal arm.

Referring to the drawings, wherein is illustrated the preferred form of my invention, and in which like characters of reference indicate corresponding parts throughout the several views, a bracket 1 is provided which consists of the two attaching plates 2 and 3 having supporting arms 4 attached thereto and projecting outwardly to connect to a channel iron 5 which receives the end of the signal arm. This bracket may be mounted at any convenient point on the automobile body and preferably at each side thereof in order that one signal may be arranged at each side of the automobile. It will be apparent, however, that only one signal arm may be arranged on each automobile if only one is desired.

As shown in detail in Fig. 6 I have provided a supporting hinge 6 which includes the leaf 7 and the leaf 8, the former being fixed by suitable bolts or screws to the bottom of the channel 5 whereby the spring or hinge may be supported in vertical position within the channel. The pintle 9 of the hinge has a portion encumbered by the coils of a tension spring 10 which has its ends engaging the faces of the leaves 7 and 8, the tendency of the spring being to maintain the hinges in open position. The outside face of the leaf 8 is permanently fixed to the end of the signal arm 11 and the latter includes a restricted portion 12 disposed within the channel 5 when the signal arm is in inoperative position. The restricted portion 12 is provided with a longitudinal passage way and connects with a light chamber 13 which has a back panel 14 and a front transparent panel 15 with a suitable signal word printed thereon as shown to advantage in Fig. 1 of the drawing. Within this light chamber, I have provided an electric light 15 connected to electrical conductors in the form of wires 17 the terminals of which are attached to contact points 18 on the plate 8. A suitable source of current is connected by wires to the contact points 19 on the corresponding plates 7 and the contact points are adapted to register with each other when the arm is swung to operative position so that the circuit will be closed for energizing the light.

At one end of the channel iron I have provided a bracket arm 20 which supports a pulley 21 over which a cable 23 is trained. This cable is attached to an eye 24 fixed to one portion of the arm 11 while the opposite terminal of the cable is connected to an operating lever 25 pivoted at any convenient point within convenient reach of the operator of the automobile. In this instance the lever 25 is pivotally connected to the steering column and when the lever is pulled rearwardly toward the operator the pull is transmitted to the arm 11 which brings the arm to operative position so that it is prominently displayed from the automobile. If desired a signal flag may be carried by the end of the arm as shown clearly in Fig. 1 of the drawing.

From the foregoing it will be observed that a very simple and durable automobile signal has been provided the details of which embody the preferred form. I desire it to be understood, however, that slight changes in the minor details of construction may be made without departing from the spirit of the invention or the scope of the claims hereunto appended.

Claims.

1. In a signal of the character described comprising a bracket having a signal arm attached thereto, the said bracket including a channel portion, a spring pressed hinge having one leaf fixed in the said channel and the other joined to the said arm to normally extend the said arm through the said channel, and means to swing the arm on the said hinge whereby the said arm may project from the side of the said channel.

2. An automobile signal comprising a bracket including a channel iron having its bottom wall disposed vertically a hinge including a pair of leaves pivotally connected together, the said hinge having a coil spring normally maintaining the leaves in open position, one of the said leaves being fixed in the said channel, a signal arm including a restricted portion projecting into the channel and having its terminal fixed to the other leaf, a cable attached to the said arm, and means attached to one end of the cable for pulling the same to impart a swinging movement to the said arm whereby the said hinge leaves may be moved into contact and the said arm projected from the said channel.

In testimony whereof I affix my signature in presence of two witnesses.

JESSE THOMAS WEAVER.

Witnesses:
GEORGE BRANTIGAM,
CARL C. WORCH.

Copies of this patent may be obtained for five cents each, by addressing the "Commissioner of Patents, Washington, D. C."